(12) United States Patent
Cohen et al.

(10) Patent No.: US 9,032,321 B1
(45) Date of Patent: May 12, 2015

(54) CONTEXT-BASED PRESENTATION OF A USER INTERFACE

(71) Applicant: Google Inc., Mountain View, CA (US)

(72) Inventors: Gabriel Aaron Cohen, Alameda, CA (US); Daniel Marc Gatan Shiplacoff, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/305,741

(22) Filed: Jun. 16, 2014

(51) Int. Cl.
*G06F 3/048* (2013.01)
*G06F 3/0484* (2013.01)

(52) U.S. Cl.
CPC ..................... *G06F 3/0484* (2013.01)

(58) Field of Classification Search
None
See application file for complete search history.

(56) References Cited

U.S. PATENT DOCUMENTS

| | | | | |
|---|---|---|---|---|
| 8,538,459 | B2 * | 9/2013 | Choi et al. | 455/456.3 |
| 8,751,500 | B2 * | 6/2014 | Duarte et al. | 707/737 |
| 2001/0035881 | A1 * | 11/2001 | Stoakley et al. | 345/772 |
| 2007/0298843 | A1 * | 12/2007 | Kwon | 455/566 |
| 2010/0106673 | A1 * | 4/2010 | Parks | 706/50 |
| 2011/0072492 | A1 * | 3/2011 | Mohler et al. | 726/3 |
| 2011/0264663 | A1 * | 10/2011 | Verkasalo | 707/740 |
| 2012/0015693 | A1 * | 1/2012 | Choi et al. | 455/566 |
| 2012/0185803 | A1 * | 7/2012 | Wang et al. | 715/847 |
| 2012/0323933 | A1 * | 12/2012 | He et al. | 707/749 |
| 2013/0080890 | A1 * | 3/2013 | Krishnamurthi | 715/702 |
| 2013/0132896 | A1 * | 5/2013 | Lee et al. | 715/808 |
| 2013/0187753 | A1 * | 7/2013 | Chiriyankandath | 340/5.51 |
| 2013/0332847 | A1 * | 12/2013 | Choi et al. | 715/745 |
| 2013/0346347 | A1 * | 12/2013 | Patterson et al. | 706/12 |
| 2013/0346408 | A1 * | 12/2013 | Duarte et al. | 707/737 |
| 2014/0201655 | A1 * | 7/2014 | Mahaffey et al. | 715/765 |

FOREIGN PATENT DOCUMENTS

EP 2 618 247 A1 7/2013

OTHER PUBLICATIONS

Miettinen et al., "ConXsense—Context Sensing for Adaptive Usable Access Control," arXiv:1308.2903, Aug. 13, 2013, Retrieved from <http://arxiv.org/pdf/1308.2903.pdf> 16 pp.

(Continued)

*Primary Examiner* — William Bashore
*Assistant Examiner* — Hien Duong
(74) *Attorney, Agent, or Firm* — Shumaker & Sieffert, P.A.

(57) ABSTRACT

A computing device is described that, while presenting a graphical user interface (GUI) associated with a first application, transitions from a first operational state to a second operational state. While in the second operational state, the computing device stops presenting the GUI associated with the first application, determines a context of the computing device, and receives a notification associated with a second application. The computing device determines, based on the context and the notification, a degree of likelihood that a user associated would access the second application, prior to the first application, after the computing device has transitioned from operating in the second operational state to operating in the first operational state. After transitioning from the second operational state to the first operational state, and responsive to determining that the degree of likelihood satisfies a likelihood threshold, the computing device presents a GUI associated with the second application.

19 Claims, 6 Drawing Sheets

(56) References Cited

OTHER PUBLICATIONS

Hsu, "Auto Screen on," Google Play Apps, May 11, 2014, Retrieved from <https://play.google.com/store/apps/details?id=com.omd.autoscreenon> 3 pp.

Seifert, "Context is king: Cover for Android changes your lock screen as you move," The Verge, Oct. 24, 2013, Retrieved from <http://www.theverge.com/2013/10/24/5024652/cover-android-lock-screen-context-movement> 5 pp.

Chen, "Context-Aware Collaborative Filtering System: Predicting the User's Preference in the Ubiquitous Computing Environment," International Workshop on Location and Context-Awareness, May 12-13, 2005, Retrieved from <http://wwwold.cs.umd.edu/class/spring2013/cmsc818g/files/contextawarecf.pdf> 10 pp.

Jack et al., "Cover," Coverscreen, Apr. 7, 2014, Retrieved from <https://www.coverscreen.com/> 6 pp.

Brown et al., "Context-aware Applications: from the Laboratory to the Marketplace," IEEE Personal Communications, Oct. 1997, 12 pp.

Seifert, "Shape-shifting Android lockscreen Cover now available," The Verge, Dec. 12, 2013, Retrieved from <http://www.theverge.com/2013/12/12/5204520/shape-shifting-android-lockscreen-cover-now-available> 3 pp.

Boehret, "Ten Tips and Tricks Every iPhone and iPad User Should Know," The Wall Street Journal, Aug. 21, 2012, Retrieved from <http://online.wsj.com/news/articles/SB10000872396390444443504577603391662755170> 4 pp.

Shah, "The Shifting Ways in Which We'll Interact with Mobile Apps," TechCrunch, Dec. 15, 2013, Retrieved from <http://techcrunch.com/2013/12/15/the-shifting-ways-in-which-well-interact-with-mobile-apps/> 9 pp.

Shin et al., Abstract of "Understanding and prediction of mobile application usage for smart phones," Proceedings of the 2012 ACM Conference on Ubiquitous Computing, Sep. 5-8, 2012, Retrieved from <http://dl.acm.org/citation.cfm?id=2370243> 2 pp.

Jablonski, "Wearable devices to usher in context-aware computing," Emerging Tech—ZDNET, May 18, 2012, Retrieved from <http://www.zdnet.com/blog/emergingtech/wearable-devices-to-usher-in-context-aware-computing/3276> 5 pp.

\* cited by examiner

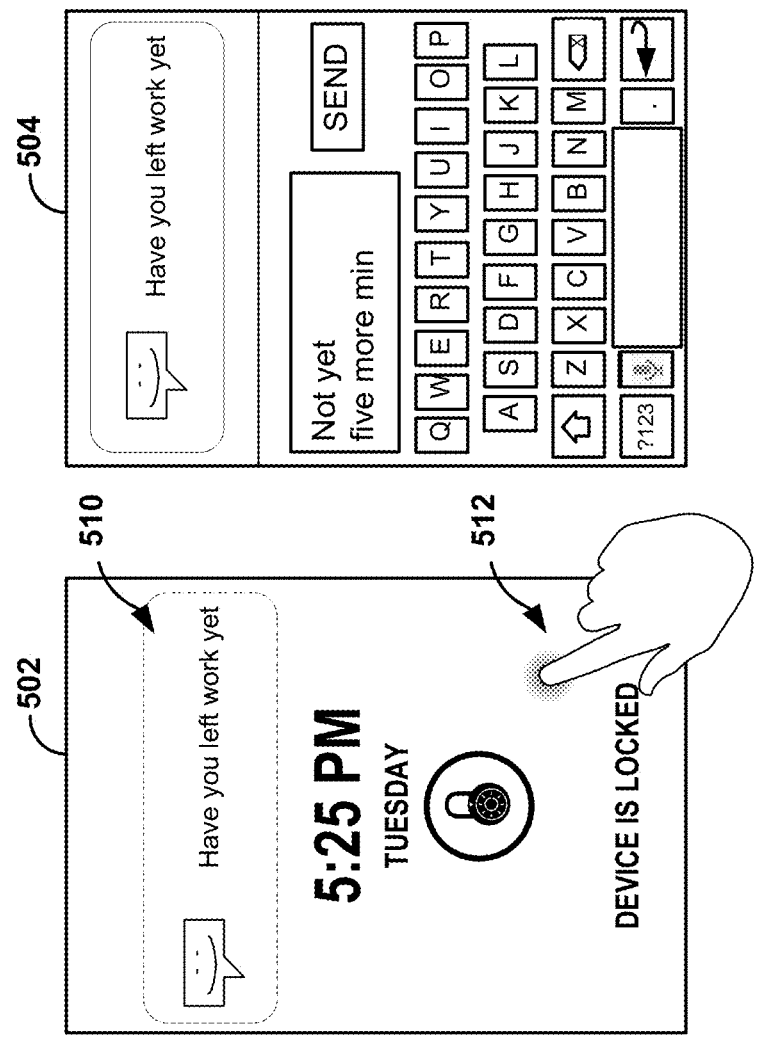
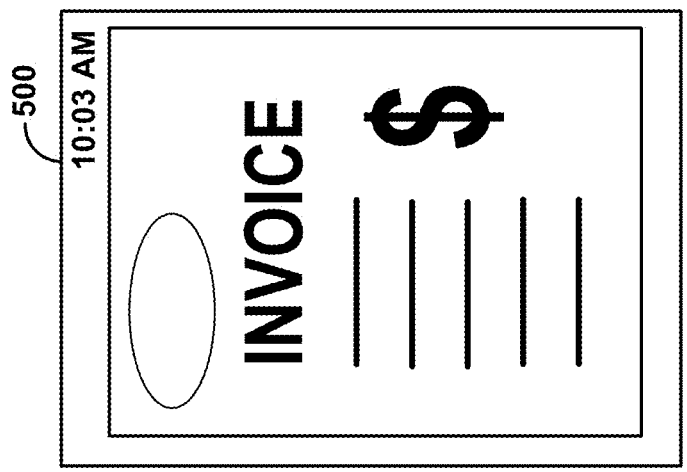
FIG. 5C
FIG. 5B
FIG. 5A

CONTEXT-BASED PRESENTATION OF A USER INTERFACE

BACKGROUND

To promote security and/or to minimize power consumption, some computing devices operate in different operational states. For instance, while operating in a full operational state, a computing device may present a graphical user interface (GUI) and provide access to all features and/or functionality of the computing device. While operating in a limited-operational state, however, a computing device may promote security and/or conserve power by, e.g., deactivating a display and/or otherwise restricting the user from accessing at least one or more features and/or functionality of the computing device.

Often times, after a computing device has transitioned from a limited operational state back to a full operational state, the computing device may immediately activate a display and present a GUI. However, in some instances the computing device may not present a particular GUI or offer immediate access to a particular feature that is of most interest to the user at that time. In such instances, the user may be forced to provide additional inputs at the computing device after the computing device has reactivated its display to cause the computing device to present the desired particular GUI and/or allow access to the particular feature that is of the most interest to the user at that time.

SUMMARY

In one example, the disclosure is directed to a method that includes, while outputting, for display, a graphical user interface associated with a first application from a plurality of applications, transitioning, by a computing device, from operating in a first operational state to operating in a second operational state. The method further includes, while operating in the second operational state: refraining from outputting, by the computing device, the graphical user interface associated with the first application; and receiving, by the computing device, a notification associated with a second application from the plurality of applications. The method further includes determining, by the computing device, a context of the computing device, and determining, by the computing device and based at least in part on the context and the notification, a degree of likelihood that a user associated with the computing device would access, after the computing device has transitioned from operating in the second operational state to operating in the first operational state and prior to the user accessing the first application, the second application. The method further includes after transitioning from operating in the second operational state to operating in the first operational state, and responsive to determining that the degree of likelihood satisfies a likelihood threshold, outputting, by the computing device, for display, a graphical user interface associated with the second application.

In another example, the disclosure is directed to a computing device that includes at least one processor and at least one module operable by the at least one processor to while outputting, for display, a graphical user interface associated with a first application from a plurality of applications, transition from operating in a first operational state to operating in a second operational state. The at least one module is further operable by the at least one processor to while operating in the second operational state: refrain from outputting the graphical user interface associated with the first application, and receive a notification associated with a second application from the plurality of applications. The at least one module is further operable by the at least one processor to determine a context of the computing device, and determine, based at least in part on the context and the notification, a degree of likelihood that a user associated with the computing device would access, after the computing device has transitioned from operating in the second operational state to operating in the first operational state and prior to the user accessing the first application, the second application. The at least one module is further operable by the at least one processor to after transitioning from operating in the second operational state to operating in the first operational state, and responsive to determining that the degree of likelihood satisfies a likelihood threshold, output, for display, a graphical user interface associated with the second application.

In another example, the disclosure is directed to a computer-readable storage medium including instructions that, when executed, configure one or more processors of a computing device to while outputting, for display, a graphical user interface associated with a first application from a plurality of applications, transition from operating in a first operational state to operating in a second operational state. The instructions, when executed, further configure the one or more processors of the computing device to while operating in the second operational state: refrain from outputting the graphical user interface associated with the first application, and receive a notification associated with a second application from the plurality of applications. The instructions, when executed, further configure the one or more processors of the computing device to determine a context of the computing device, and determine, based at least in part on the context and the notification, a degree of likelihood that a user associated with the computing device would access, after the computing device has transitioned from operating in the second operational state to operating in the first operational state and prior to the user accessing the first application, the second application. The instructions, when executed, further configure the one or more processors of the computing device to after transitioning from operating in the second operational state to operating in the first operational state, and responsive to determining that the degree of likelihood satisfies a likelihood threshold, output, for display, a graphical user interface associated with the second application.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 5A-5C are conceptual diagrams illustrating example graphical user interfaces that are output for display by an example computing device, in accordance with one or more aspects of the present disclosure.

DETAILED DESCRIPTION

Figure 1:
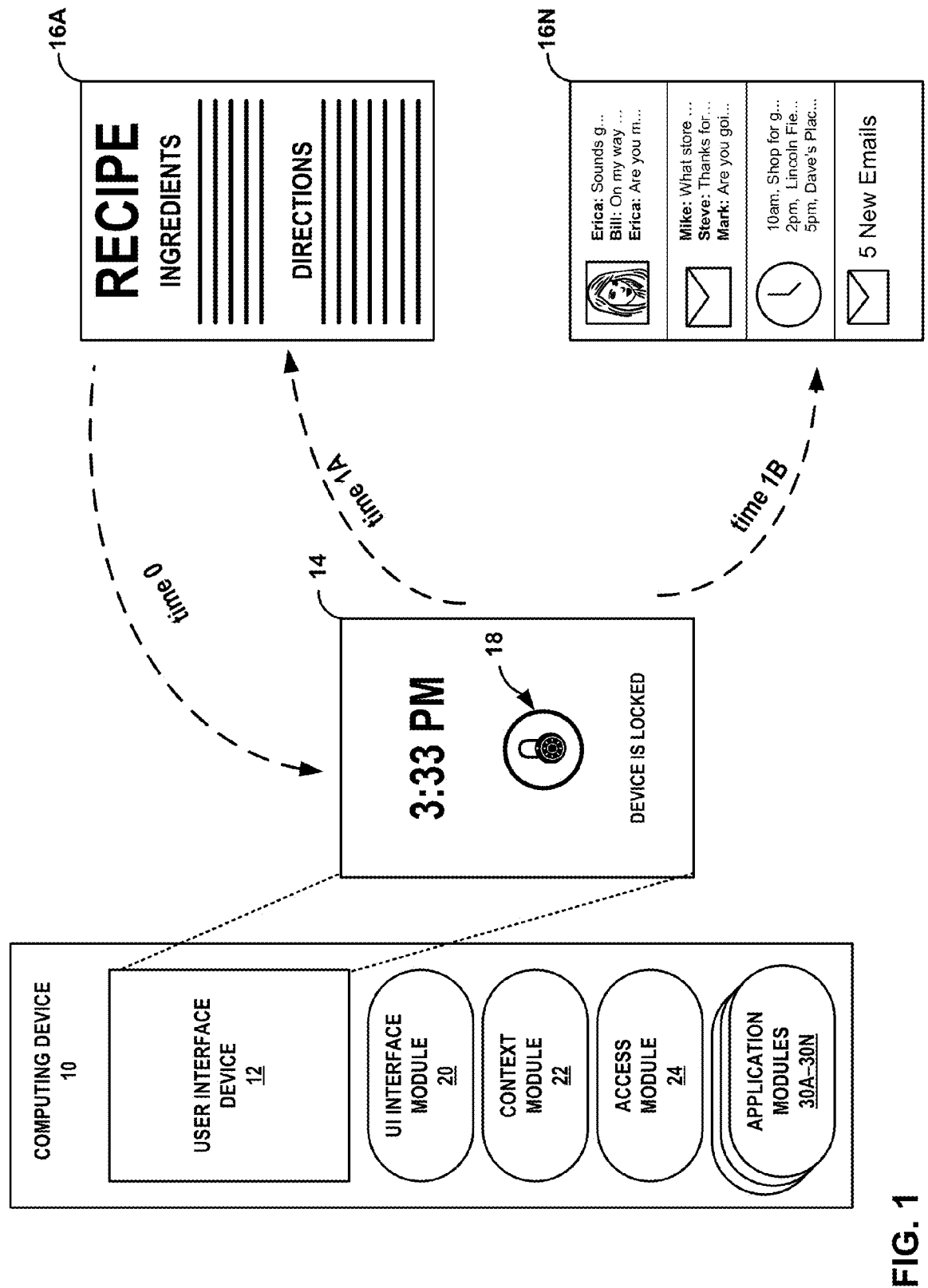
FIG. 1 is a conceptual diagram illustrating an example computing device that is configured to display one or more graphical user interfaces based on a context of the computing device, in accordance with one or more aspects of the present disclosure.

In general, techniques of this disclosure may enable a computing device to determine whether a user would more likely want to access a graphical user interface (GUI) of a recently used application or a GUI of an application associated with a recently received notification after the computing device has transitioned from a first operational state to a second operational state. For example, a computing device (e.g., a mobile phone, a desktop computer, a laptop computer, a tablet computer) may be configured to operate in an initial operational state (e.g., a full-operational state), during which the computing device presents a GUI associated with a first application. The computing device may be further configured to, in such instances, exit the initial operational state and transition to a subsequent operational state (e.g., a limited operational state during which the computing device refrains from presenting the GUI) responsive to, for example, user input and/or some other condition (such as a contextual condition and/or threshold) being met.

While operating in the subsequent operational state, the computing device may be further configured to receive a notification (e.g., data indicating the receipt of an e-mail, a text message, other information) associated with a second application. The computing device may be further configured to, in some instances, eventually transition from the subsequent operational state back to the initial operational state and resume outputting graphical content for display (e.g., after detecting a user input to present graphical content, unlock the device, etc.). However, upon resuming the output of graphical content, rather than presenting a GUI including audiovisual content that a user may or may not immediately be interested in, the computing device may be configured to automatically present a GUI that includes content that is more likely to be of interest to the user. More specifically, depending on a current context of the computing device and the recently received notification, the computing device may determine whether the GUI associated with the first application or a GUI associated with the second application is more likely to be of interest to the user. After transitioning back to the initial operational state, the computing device may be configured to automatically present the GUI that is more likely to be of interest to the user. In this manner, computing devices configured according to techniques of this disclosure may automatically present a GUI, depending on a context and information associated with a notification, that is more likely to be of interest to a user at a particular time. After resuming presentation of graphical content, such computing devices may spend less time, and potentially require fewer inputs from a user, before presenting a GUI or allowing access to an application that is likely to be of most interest to the user at a particular time.

Throughout the disclosure, examples are described where a computing device and/or a computing system may analyze information (e.g., locations, speeds) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed), or to dictate whether and/or how to the computing device may receive content that may be relevant to the user. In addition, certain data may be treated in one or more ways before it is stored or used by the computing device and/or computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

FIG. 1 is a conceptual diagram illustrating computing device 10 that is configured to display graphical user interfaces 16A and 16N depending on a context of computing device 10, in accordance with one or more aspects of the present disclosure. In the example of FIG. 1, computing device 10 may be a mobile phone. However, in other examples, computing device 10 may be a tablet computer, a personal digital assistant (PDA), a laptop or desktop computer, a portable gaming device, a portable media player, an e-book reader, a watch, a wearable computing device, a television platform, or another type of mobile or non-mobile computing device.

As shown in FIG. 1, computing device 10 includes user interface device (UID) 12. UID 12 of computing device 10 may function as an input device for computing device 10 and as an output device. UID 12 may be implemented using various technologies. For instance, UID 12 may function as an input device using a presence-sensitive input device, such as a resistive touchscreen, a surface acoustic wave touchscreen, a capacitive touchscreen, a projective capacitance touchscreen, a pressure sensitive screen, an acoustic pulse recognition touchscreen, track-pad, or another presence-sensitive input device technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen (e.g., presence-sensitive display) that may receive tactile user input from a user of computing device 10. UID 12 may receive indications of the tactile user input by detecting one or more tap and/or non-tap gestures from a user of computing device 10 (e.g., the user touching or pointing to one or more locations of UID 12 with a finger or a stylus pen). The presence-sensitive screen of UID 12 may present output to a user. UID 12 may present the output as a user interface (e.g., user interface 14, 16A, 16N) which may be related to functionality provided by computing device 10. For example, UID 12 may present various user interfaces of applications (e.g., a lock screen, an e-book reader application, a notification center application, an electronic message application, an Internet browser application) executing at computing device 10. A user of computing device 10 may interact with one or more of these applications to perform a function with computing device 10 through the respective user interface of each application.

Computing device 10 may include user interface ("UI") module 20, context module 22, access module 24, and application modules 30A-30N (collectively "application modules 30"). Modules 20, 22, 24, and 30 may perform operations described using software, hardware, firmware, or a mixture of both hardware, software, and firmware residing in and executing on computing device 10. Computing device 10 may execute modules 20, 22, 24, and 30 with multiple processors. Computing device 10 may execute modules 20, 22, 24, and 30 as a virtual machine executing on underlying hardware.

Context module 22 of computing device 10 may determine a context of computing device 10 by aggregating and assembling contextual information obtained by various sensors or other types of input devices received by computing device 10 into data indicative of the state and/or physical operating environment of computing device 10 and a user of computing device 10. For instance, a context of computing device 10 may include, but is not limited to, location data, temporal data, directional data, speed, velocity, acceleration or other movement data, orientation related data, or other data specifying the state or physical operating environment of computing device 10 and a user of computing device 10.

For example, context module 22 may determine an orientation of computing device 10 (e.g., a degree of pitch, roll, yaw) and update the orientation as context module 22 detects a change in the orientation associated computing devices 10 over time. Context module 22 may determine a relative location of computing device 10, or in other words, a degree of closeness to computing device 10 and one or more other computing devices (e.g., a wearable computing device, other mobile or non-mobile computing devices).

Context module 22 may determine a physical location of computing device 10 and update the physical location as context module 22 detects indications of movement associated computing devices 10 over time. Context module 22 may determine an actual physical location or a relative location. For instance, context module 22 may determine an address, a coordinate location, a building name associated with the location of computing device 10, whether computing device 10 is at a home location associated with a user of computing device 10, or a work location associated with a user of computing device 10, to name a few non-limiting examples.

As used throughout the disclosure, the terms "context" or "contextual information" are used to describe information that can be used by a computing system and/or computing device, such as computing device 10, to determine one or more environmental characteristics associated with computing devices and/or users of computing devices, such as past, current, and future physical locations, degrees of movement, weather conditions, traffic conditions, patterns of travel, and the like. In some examples, contextual information may include sensor information obtained by one or more sensors (e.g., gyroscopes, accelerometers, proximity sensors) of computing device 10, radio transmission information obtained from one or more communication units and/or radios (e.g., global positioning system (GPS), cellular, Wi-Fi) of computing device 10, information obtained by one or more input devices (e.g., cameras, microphones, keyboards, touchpads, mice, UID 12) of computing device 10, and network/device identifier information (e.g., a network name, a device internet protocol address).

In the example described herein, a computing device may analyze contextual information or other information associated with a computing device only if the computing device receives permission from the user to analyze the information. For example, in situations discussed below in which the computing device may collect or may make use of information associated with the user and/or the computing device, the user may be provided with an opportunity to provide input to control whether programs or features of the computing device can collect and make use of user information (e.g., information about a user's current location, current speed), or to dictate whether and/or how to the computing device may receive content that may be relevant to the user. In addition, certain data may be treated in one or more ways before it is stored or used by the computing device and/or a computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information, including contextual information, is collected about the user and used by the computing device.

In any event, context module 22 may provide an indication of a context of computing device 10 to UI module 20 for use in determining a degree of likelihood that a user associated with computing device 10 would access, after computing device 10 has transitioned from operating in one operational state to operating in a different operational state and prior to the user accessing a first application, a second application. For example, context module 22 may provide data to UI module 20 that indicates to UI module 20 the location of computing device 10, the current time, a location history of computing device 10, a degree of orientation of computing device 10, and/or an orientation history of computing device 10, to name a few examples. As is described below, UI module 20 may use the context from context module 22 to determine the degree of likelihood that the user would access the second application after transitioning to a first operational state (e.g., a full-operational state) and/or resuming the presentation of graphical content in order to present a GUI associated with an application that will more likely be of interest to a user of computing device 10.

Application modules 30 of computing device 10 may each perform various functions or provide access to one or more services accessed by computing device 10. Each of application modules 30 may execute at as part of an operating system, platform, or other operating environment associated with computing device 10. Additionally, one or more application modules 30 may provide a graphical user interface (GUI) as part of their execution. For example, application modules 30 may output graphical content to UI module 20 that causes UI module 20 to present respective GUIs associated with each of application modules 30 at UID 12. Examples of application modules 30 include: a notification service or center module from which information associated with a notification can be obtained, a communication or messaging application (e.g., for performing e-mail, text-based, telephone, voicemail, instant messaging, video chat, or other telecommunication related functions for computing device 10), a game application, an Internet browser application, a calendar application, a social media application, a map or navigation application, or any and all other types of applications that provide graphical content for display.

In the example of FIG. 1, application module 30A represents an Internet browser application and provides graphical content to UI module 20 for causing UID 12 to present GUI 16A. GUI 16A is illustrated as being a webpage GUI having a recipe that a user of computing device 10 may view at UID 12 while he or she cooks at home in his or her kitchen. In the example of FIG. 1, application module 30N represents a notification service application and provides graphical content to UI module 20 for causing UID 12 to present GUI 16N. GUI 16N is illustrated as being a notification center GUI for accessing information associated with one or more notifications received by computing device 10. Notification center GUI 16N includes a plurality of graphical indications comprising text, images, and other information associated with notifications received by computing device 10. For example, GUI 16N includes a graphical indication of an instant message conversation update, an e-mail message thread, one or more calendar reminders, and an indication of recently received e-mail messages.

Access module 24 may control access (e.g., by a user, a computing system, a computing device) to applications and information stored on computing device 10 by causing computing device 10 to transition between various operational states of computing device 10. Access module 24 may further control the amount of power consumed by computing device 10 and implement power saving techniques on behalf of computing device 10 by causing computing device 10 to transition between various operational states of computing device 10.

For example, access module 24 may configure, and cause computing device 10 to transition to a second operational state in which computing device 10 is "locked" and restricts access to a user to some or all features, functions, and/or applications 30. Access module 24 may configure, and cause computing device 10 to transition to a first operational state in which computing device 10 is "unlocked" and allow access to a user to at least a portion of all features, functions, and/or applications 30. Access module 24 may configure, and cause computing device 10 to transition to the second operational state to cause computing device 10 to reduce the amount electrical power being consumed by computing device 10 (e.g., by deactivating UID 12 or otherwise ceasing to output graphical content for display). Access module 24 may configure, and cause computing device 10 to transition to the first operational state to cause computing device 10 to increase the amount electrical power being consumed by computing device 10 (e.g., by re-activating UID 12 or otherwise resuming the output of graphical content for display).

As used throughout this disclosure, the term "limited-operational state" is used to generally describe an operating state in which computing device 10 is configured to restrict access to at least a portion of the features and functionality of computing device 10 and/or operates in such a way as to limit the amount of power being consumed by computing device 10. For example, UID 12 of computing device 10 may be deactivated while computing device 10 operates in a limited-operational state. In addition, while in a limited-operational state, computing device 10 may be configured to present a lock screen GUI (e.g., GUI 14), but may otherwise cease or refrain from outputting graphical content, for display.

Conversely, as used throughout this disclosure, the term "full-operational state" is used to generally describe an operating state in which computing device 10 is configured to allow access to at least a portion of the features and functionality of computing device 10 that are otherwise restricted while operating in a limited-operational state and/or operate in such a way as to allow a maximum amount of power to be consumed by computing device 10. In addition, while in a full-operational state, UID 12 of computing device 10 may be activated and computing device 10 may be configured to output graphical content (e.g., GUIs 16A and 16N) for display at UID 12.

In some examples, access module 24 may be part of an operating system of computing device 10 and cause computing device 10 to transition to a full-operational state to provide a user with access to the features or functionality of computing device 10 after a determining that an input detected at UID 12 indicates that the user wishes to interact with computing device 10. For example, if UID 12 and UI module 20 detects input at UID 12, while computing device 10 is operating in a limited-operational state, access module 24 may cause computing device 10 to transition to a full-operational state.

In some examples, access module 24 may be part of an operating system of computing device 10 and cause or otherwise configure computing device 10 to transition to a limited-operational state to conserve battery power, prevent access to, or otherwise, limit the features or functionality of computing device 10 after a period of inactivity (e.g., a timeout) between the user and computing device 10. For example, if UID 12 and UI module 20 does not detect input at UID 12 for a period of time (e.g., five minutes), access module 24 may cause computing device 10 to transition to a limited-operational state.

Access module 24 may issue commands to UI module 20 for causing UI module 20 to enable or disable (e.g., activate or deactivate) UID 12 depending on whether access module 24 causes computing device 10 to operate in a full-operational state or a limited-operational state. Access module 24 may send graphical content and instructions for presenting a rendering or image of a GUI depending on whether access module 24 causes computing device 10 to operate in a full-operational state or a limited-operational state.

Access module 24 may receive input data and graphical element location data from UI module 20 and determine, based on the data from UI module 20, whether to transition from operating in one operational state to another operational state. For instance, GUI 14 includes unlock region 18 from which a user may provide input (e.g., a gesture) to cause computing device 10 to transition from operating in a limited-operational state to operating in a full-operational state. Access module 24 may receive and analyze input data obtained from UI module 20 as UID 12 detects user input at unlock region 18 and determine whether to cause computing device 10 to exit the limited-operational state or to remain in the limited-operational state. Access module 24 may determine whether to cause computing device 10 to transition from operating in a limited-operational state to operating in a full-operational state. Access module 24 may receive an indication of user input (e.g., data, touch events) from UI module 20 and determine based on the user input whether the user input has characteristics (e.g., a length, a speed, a pattern) that meet an unlocking threshold to cause computing device 10 to transition from operating in a limited-operational state to operating in a full-operational state. Access module 22 may cause computing device 10 to exit a limited-operational state and transition to a different state from which the user can access protected information stored on computing device 10, access GUIs 16A and 16N at UID 12, and/or access features of application modules 30.

UI module 20 may act as an intermediary between various components of computing device 10 to make determinations based on input (e.g., detected by UID 12) and generate output (e.g., presented at UID 12). For instance, UI module 20 may receive, as an input from application module 30A, graphical content and instructions for presenting a rendering or image of a webpage GUI for display at UID 12 as GUI 16A. UI module 20 may receive, as an input from application module 30B, graphical content and instructions for presenting an image or rendering of a notification center GUI for display at UID 12 as GUI 16N.

UI module 20 may receive, as an input from UID 12, a sequence of touch events generated from information about user input detected by UID 12. UI module 20 may determine that the one or more location components in the sequence of touch events approximate a selection of one or more graphical elements (e.g., unlock region 18 of GUI 14). UI module 20 may transmit, as output to modules 22, 24, and/or 30, the sequence of touch events received from UID 12, along with locations where UID 12 presents each of the graphical elements at UID 12 for further processing by modules 22, 24, and/or 30 of the user input.

UI module 20 may cause UID 12 to present a GUI associated with a component of an operating platform of computing device 10, modules 22 or 24, or application modules 30 (e.g., GUIs 14, 16A, and 16N). In other words, UI module 20 may output information to UID 12 to cause UID 12 to output graphical content for display and may send additional information to UID 12 to cause UID 12 to refrain from or cease outputting graphical content for display. To minimize the amount of time that a user spends interacting with computing device 10 in order to cause computing device 10 to present the graphical information that he or she desires at a current time, UI module 20 may automatically (e.g., without user intervention) predict, infer, or otherwise determine, which respective GUI associated with one of application modules 30 to present at UID 12 at a particular time, without requiring the user to navigate to the respective GUI at that particular time.

For example, when computing device 10 activates UID 12, UI module 20 may cause UID 12 to present a default GUI or a GUI associated with an operating system from which a user can provide input to navigate and invoke a particular feature, function, or application 30 executing at computing device 10. Access module 24 may cause UI module 20 to present GUI 14 when computing device 10 activates UID 12. When access module 24 causes computing device 10 to transition from a limited-access in which UID 12 presents GUI 14, to a full-operational state, UI module 20 may infer, predict, or determine, based on a context of computing device 10 received from context module 22, whether to present a GUI of a previously used one of applications 30 (e.g., GUI 16A) or otherwise, present a GUI of one of applications 30 that is associated with a recently received notification (e.g., GUI 16N).

UI module 20 may determine a respective degree of likelihood (e.g., a probability, a score) associated with each of application modules 30 that a user would want to access a GUI of that application at a particular time and, after computing device 10 has transitioned from one state to another, present the GUI with the highest degree of likelihood at UID 12. In other words, UI module 20 may assign a probability, a score, and/or a degree of likelihood to each of application modules 30. To minimize the time spent by a user navigating from one GUI to the next, UI module 20 may present the GUI of one of application modules 30 that UI module 20 determines would most likely be accessed by a user after computing device 10 has transitioned from a limited-operational state during which UID 12 does not output graphical content for display, to a full-operational state during which UID 12 resumes the output of graphical content for display.

UI module 20 may base the respective degree of likelihood associated with each of application modules 30 on a context of computing device 10 received from context module 22. In other words, UI module 20 may determine which one or more application modules 30 are "contextually relevant" to a determined context of computing device 10 based on contextual information received by computing device 10.

As used herein, one or more application modules 30 may be contextually relevant if those one or more application modules 30 have content, one or more attributes, and/or one or more characteristics that are related to a context (e.g., location, event, meeting, or other characteristic associated with a context) of computing device 10 at a particular time. For example, a context of computing device 10 may indicate that computing device 10 has a degree of orientation that is similar to the orientation of computing device 10 when being held in a person's hand as the person is reading information being presented at a screen of the computing device. One or more application modules 30 may perform functions related to reading (e.g., presenting pages of an electronic book or document at UID 12, etc.). UI module 20 may determine that when the context of computing device 10 indicates that computing device 10 is being held like a book, the context is contextually relevant to the one or more application modules 30 that perform functions related to reading.

In some examples, file UI module 20 may receive contextual information from context module 22 in substantially real-time. In other examples, UI module 20 may receive contextual information from context module 22 at various earlier times and use the earlier information to learn and produce rules (e.g., using artificial intelligence or machine learning techniques) for determining a likelihood that one or more application modules 30 are contextually relevant and likely to be accessed by a user using computing device 10 at a later, particular time. For example, UI module 20 may provide the context of computing device 10 as input to a machine learning or rules based system for determining a likelihood that the user will want to access one or more application modules 30 at a particular time associated with the context. UI module 20 may receive as output from the machine learning or rules based system, a probability, score, or other indication indicating which of application modules 30 that the user would most likely want to access at a particular time. In some examples, UI module 20 may rank the two highest order application modules 30 (e.g., the two application modules 30 having the highest degrees of likelihood) as being either the most recently accessed one of application modules 30 or the one of application modules 30 that is associated with a most recently received notification (e.g., a most recently received notification since computing device 10 transitioned from a first or full-operational state to a second or limited-operational state).

The techniques are now further described in detail with reference to FIG. 1. In the particular, non-limiting example of FIG. 1, computing device 10, while outputting, for display, a graphical user interface associated with a first application from a plurality of applications, may transition from operating in a first operational state to operating in a second operational state. For example, application module 30A (e.g., a web browser application) may send graphical content to UI module 20 for causing UID 12 to present GUI 16A at UID 12 while access module 24 causes computing device 10 to operate in a full-access mode. A user of computing device 10 may be located in his or her home kitchen and viewing a recipe presented within GUI 16A as he or she cooks a meal. FIG. 1 shows that at time 0, after a period of inactivity from the user, access module 24 may cause computing device 10 to transition to a limited-operational state and deactivate or cease powering UID 12.

After time 0, while operating in the second operational state, computing device 10 may refrain from outputting the graphical user interface associated with the first application, and receive a notification associated with a second application from the plurality of applications. For example, while computing device 10 operates in the limited-operational state, access module 24 may cause UI module 20 to refrain from outputting GUI 16A at UID 12 (e.g., to conserve power). In addition, while computing device 10 operates in the limited-operational state, application module 30N (e.g., a notification services application) may receive an indication (e.g., data) of a new notification received by computing device 10 (e.g., an e-mail, an instant message, a voice/video message). Application module 30N may queue the notification in a notification queue to be presented as graphical content at some point in the future (e.g., when UID 12 is re-activated).

Computing device 10 may determine a context of computing device 10. For example, context module 22 may periodically update a location of computing device 10 or determine a degree of orientation associated with computing device 10. In determining a context, context module 22 may determine at least one of: a location associated with computing device 10, a time of day, a degree of movement associated with computing device 10, an orientation associated with computing device 10, a barometric pressure associated with computing device 10, or an ambient light level associated with computing device 10. By determining the context, context module 22 may determine whether computing device 10 is in a pocket of a user, on a table top, in a person's hands, etc. and provide contextual information about the light, orientation, or placement of computing device 10 to UI module 20 for better predicting which GUI a user may wish to access.

Context module 22 may output location data to UI module 20 indicating that the location of computing device 10 has not changed since computing device 10 transitioned from the full-operational state during which UID 12 presented GUI 16A to now as UID 12 is powered-off and ceases to display GUI 16A.

Based at least in part on the context and the notification, UI module 20 may determine a degree of likelihood that a user associated with the computing device would access, after the computing device has transitioned from operating in the second operational state to operating in the first operational state and prior to the user accessing the first application, the second application (e.g., application module 30N). In other words, UI module 20 may anticipate which one of application modules 30 that a user of computing device 10 would more likely want to access initially, after computing device 10 has transitioned back to the full-operational state.

UI module 20 may input the contextual information obtained from context module 22 into a machine learning or rules based algorithm and determine a degree of likelihood associated with application modules 30 to identify one of application modules 30 that has a high enough degree of likelihood to indicate that the user may wish to access that application first. For example, UI module 20 may input a location history, orientation history, or other contextual information into a machine learning algorithm of UI module 20. If, for example, the context of computing device 10 indicates that the location of computing device 10 and/or the orientation of computing device 10 is unchanged since computing device 10 last transitioned to the limited-operational state, the machine learning algorithm of UI module 20 may determine a high probability (e.g., greater than fifty percent) that the user would want to access application module 30A (e.g., the last used application prior to the transition) before any other one of application modules 30 when computing device 10 resumes output of graphical content at UID 12. Because a notification was recently received by application module 30N, UI module 20 may determine a degree of likelihood that the user may wish to access application module 30N before any other application once computing device 10 resumes presentation of graphical content at UID 12. UI module 20 may determine a lesser probability (e.g., less than fifty percent) that the user may wish to access application module 30N if, for example, information associated with the notification (e.g., textual information, time data, type data, user data, etc.) indicates that the notification is unrelated to the current context of computing device 10.

After transitioning from operating in the second operational state to operating in the first operational state, and responsive to determining that the degree of likelihood satisfies a likelihood threshold, computing device 10 may output, for display, a graphical user interface associated with the second application or the graphical user interface associated with the first application. For example, a user may provide input (e.g., a gesture) at a location of UID 12. Access module 24 may cause UI module 20 to output GUI 14 for display. The user may provide an additional input at UID 12, this time at a location of UID 12 at which unlock region 18 is displayed. Access module 24 may determine that the touch events associated with the input at unlock region 18 satisfy the credentials of access module 24 to cause computing device 10 to transition from operating in the limited-operational state to operating in the full-operational state.

At time 1A, computing device 10 may determine that the degree of likelihood associated with application module 30A exceeds a threshold (e.g., fifty percent). As such, when UI module 20 receives a command from access module 24 to resume output of graphical content at UID 12, UI module 20 may automatically cause UID 12 to present GUI 16A (e.g., the GUI of the most recently used application).

FIG. 1 further illustrates that, in some examples, after transitioning from operating in the second operational state to operating in the first operational state, and responsive to determining that the degree of likelihood associated with application module 30N exceeds a threshold and is a higher degree of likelihood than the degree of likelihood associated with application module 30A, computing device 10 may refrain from outputting the graphical user interface associated with the first application, and instead output, for display, the graphical user interface associated with the second application. In other words, UI module 20 may determine that the likelihood associated with application module 30A is not sufficiently high enough to warrant the immediate and automatic display of GUI 16A but the likelihood associated with application module 30N is high enough to warrant display of GUI 16N. As such, at time 1B, UI module 20 may cause UID 12 to present GUI 16N of application module 30N at UID 12 since application module 30N (e.g., an application associated with the most recently received notification since computing device 10 transitioned from a first or full-operational state to a second or limited-operational state).

In this manner, a computing device according to these techniques may automatically present a GUI, depending on a context of the computing device and a received notification, which is more likely to be of interest to a user at a particular time. After resuming presentation of graphical content, the computing device may spend less time, and potentially require fewer additional inputs from a user, before presenting a GUI or allowing access to an application that is likely to be of most interest to the user at a particular time. By determining what the user would want to view once the computing device is configured to resume the presentation of graphical content, the computing device may alleviate the need for a user to provide inputs to navigate to a particular GUI. By alleviating or at least reducing the amount of inputs required from a user, the computing device may receive fewer false inputs as a user interacts with the computing device. By reducing the quantity of inputs from a user, and reducing the quantity of false inputs, the computing device may perform fewer operations and consume less electrical power.

Figure 2:
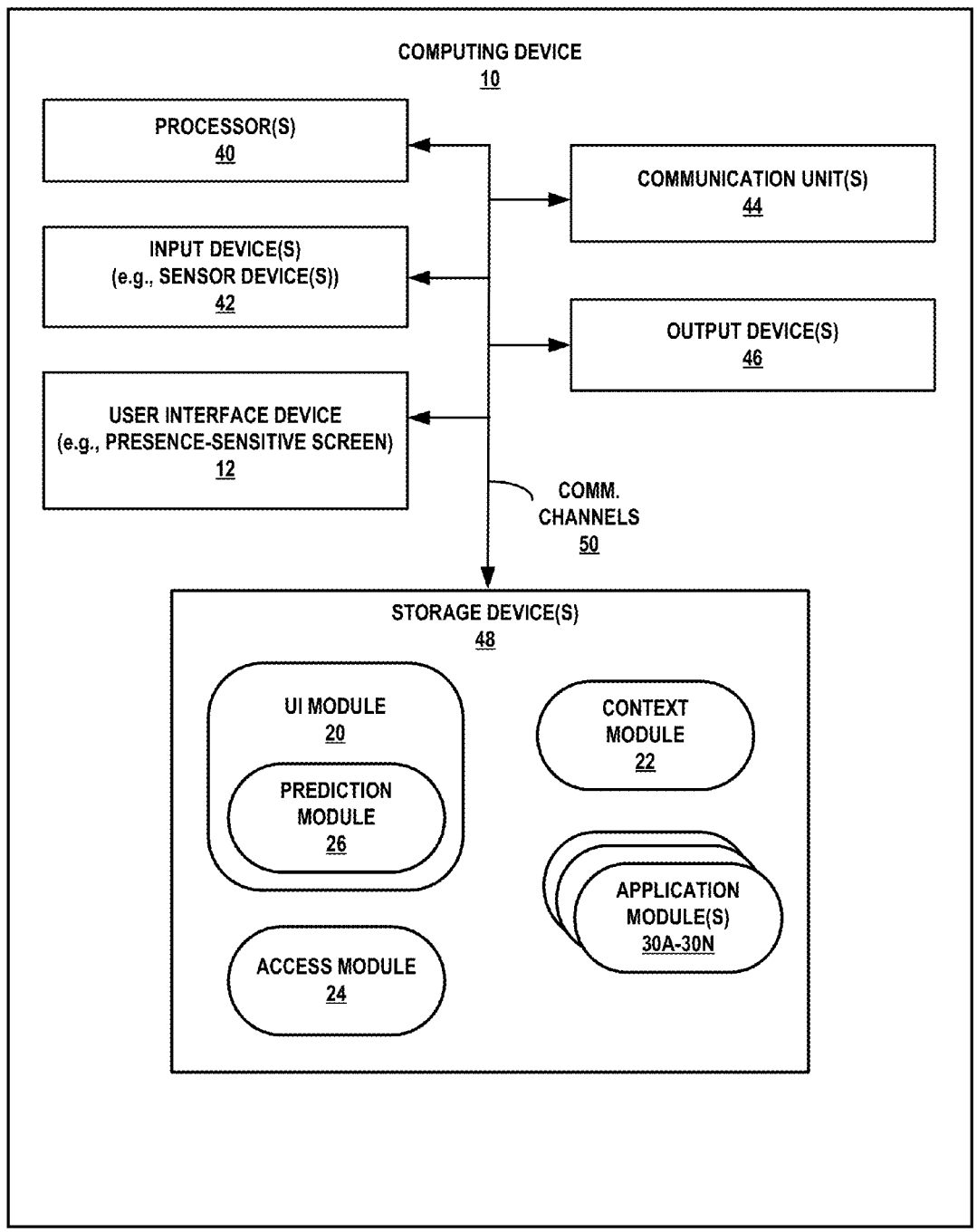
FIG. 2 is a block diagram illustrating an example computing device configured to output one or more graphical user interfaces, in accordance with one or more aspects of the present disclosure.

FIG. 2 is a block diagram illustrating an example computing device configured to output one or more graphical user interfaces, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, context module 22, access module 24, and application modules 30. UI module 20 also includes prediction module 26.

Communication channels 50 may interconnect each of the components 12, 20, 22, 24, 26, 30, 40, 42, 44, 46, and 48 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone, or any other type of device for detecting input from a human or machine. Input devices 42 further include sensor devices such as an ambient light sensor, a barometric pressure sensor, a gyro sensor, an orientation sensor, a tilt sensor, an accelerometer, a speedometer, a thermometer, and any other sensor device, e.g., for detecting, as input, contextual information as described herein.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interface 14, 16A, or 16N of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data that modules 20, 22, 24, 26, and 30 may access during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20, 22, 24, 26, and 30.

One or more processors 40 may implement functionality and/or execute instructions within computing device 10. For example, processors 40 on computing device 10 may receive and execute instructions stored by storage devices 48 that execute the functionality of modules 20, 22, 24, 26, and 30. These instructions executed by processors 40 may cause computing device 10 to read/write/etc. information, such as one or more data files stored within storage devices 48 during program execution. Processors 40 may execute instructions of modules 20, 22, 24, 26, and 30 to cause UID 12 to automatically present a GUI that is more likely to be accessed by a user of computing device 10 after computing device 10 has transitioned from a second operational state, back to a first operational state. That is, modules 20, 22, 24, 26, and 30 may be operable by processors 40 to perform various actions or functions of computing device 10, for instance, causing UID 12 to automatically present user interface 14, 16A, or 16N at UID 12.

Prediction module 26 of UI module 20 may perform functions for inferring, predicting, or otherwise determining which one of application modules 30 that a user of computing device 10 would want to access when computing device 10 has transitioned from one operational state to a different operational state. In general, prediction module 64 of UI module 20 may receive "a context" from context module 22 and, based on the context, determine whether a user of computing device 10 is more likely to want to interact with a most recently accessed one of application modules 30, or whether the user is more likely to want to access one of application modules 30 that is related to a most recently received notification.

For example, prediction module 26 may rely on a machine learning algorithm and/or a rules-based system for determining a respective degree of likelihood (e.g., a probability), for each of application modules 30, that a user of computing device 10 would want to access that application module 30 after computing device 10 has transitioned from a second operational state (e.g., a limited-operational state) to a first operational state (e.g., a full-operational state). Prediction module 26 may provide the context of computing device 10 as an input to the machine learning algorithm and/or rules based system and receive a respective probability, binary result, or other value that indicates the likelihood that a user would wish to access one application module 30 over each of the other application modules 30.

Prediction module 26 may periodically update the computed degrees of likelihood associated with application modules 30. For example, at a first time, when computing device 10 has initially transitioned from a first operational state to a second operational state, prediction module 26 may determine an initial degree of likelihood associated with application module 30A. At a subsequent time, for instance after computing device 10 receives a notification associated with application module 30N and/or as a context of computing device 10 changes, prediction module 26 may determine an updated degree of likelihood associated with application module 30A that may be higher or lower than the previously determined degree of likelihood.

In operation, while outputting, for display, a graphical user interface associated with a first application from a plurality of applications, computing device 10 may transition, from operating in a first operational state to operating in a second operational state. For example, while UI module 20 causes UID 12 to present a GUI associated with application module 30A (e.g., GUI 16A), access module 24 may detect an input at input device 42 (e.g., a user initiated command to cause computing device 10 to enter standby mode and operate in a limited-operational state). In response to the input, access module 24 may deactivate UID 12 and UI module 20 to cease outputting GUI 16A for display.

While operating in the second operational state, computing device 10 may refrain from outputting the graphical user interface associated with the first application, and receive a notification associated with a second application from the plurality of applications. For example, prediction module 26 may receive a context associated with computing device 10 from context module 22 after computing device 10 enters the limited-operational state.

Prediction module 26 may preserve or store the context and determine a degree of likelihood that the user of computing device 10 may wish to resume interacting with application module 30A, later, when and if computing device 10 has transitioned back to the full-operational state. Application module 30N may receive a notification from a notification service and queue the notification in a notification queue to be presented as graphical content at some point in the future (e.g., when UID 12 is re-activated). Being that application module 30N is associated with the recently received notification, prediction module 26 may determine a degree of likelihood that the user of computing device 10 may wish to resume interacting with application module 30N when and if computing device 10 has transitioned back to the full-operational state. Prediction module 26 may periodically receive an updated context and depending on whether the context has changed, determine an updated degree of likelihood indicating that application module 30A and/or 30N is the preferred application module 30 that the user would wish to have immediate access to when computing device 10 returns to the full-operational state.

After transitioning from operating in the second operational state to operating in the first operational state, and responsive to determining that the degree of likelihood satisfies a likelihood threshold, computing device 10 may output, for display, the graphical user interface associated with the first application. For example, access module 24 may command computing device 10 and UI module 20 to resume operating in the full-operational state. UI module 20 may analyze each respective degree of likelihood associated with each of application modules 30 and select the one of application modules 30 with the highest degree of likelihood as being the application module 30 that the user would wish to access when UID 12 is re-activated. UI module 20 may determine that the degree of likelihood of application module 30A satisfies a threshold when and if the degree of likelihood exceeds respective degrees of likelihood associated with the other application modules 30. In other words, the threshold may correspond to the degree of likelihood associated with application module 30N when UI module 20 is determining whether or not to present GUI 16A of application module 16A before any other GUI of any other application modules 30. UI module 20 may cause UID 12 to present GUI 16A in response to determining that the degree of likelihood of application module 30 satisfies the threshold.

In some examples, prediction module 26 may update a respective probability associated with each of application modules 30 based on changes in context of computing device 10 to ensure that computing device 10 automatically presents the respective GUI associated with the one of application modules 30 that is more likely to be of interest to a user at a particular time (e.g., after computing device 10 has transitioned back to an operational state at which computing device 10 resumes presentation of graphical content at UID 12). For example, prior to transitioning from operating in the first operational state to operating in the second operational state, context module 22 may determine an initial location of computing device 10. For instance, the location of computing device 10 may correspond to a room or area (e.g., the kitchen) of a domicile of a user. Prediction module 26 may input the initial location into a predictive model used for determining which of application modules 30 that is more likely to be of interest to a user at a particular time and receive an initial likelihood associated with application module 30A being the one of application modules 30 that is more likely to be of interest to the user.

Context module 22 may determine, based on the context (e.g., contextual information), a subsequent location of the computing device. Prediction module 26 may receive the subsequent location and provide the new location as input to its machine learning system. Prediction module 26 may modify, based on a distance between the initial location and the subsequent location, the degree of likelihood that the user associated with computing device 10 would access the first application. In other words, prediction module 26 may update the degree of likelihood based on changes in location and/or movement detected by computing device 10.

For example, responsive to determining that the distance does not exceed a threshold, prediction module 26 may increase the degree of likelihood that the user associated with computing device 10 would access application module 30A. In some examples, responsive to determining that the distance exceeds the threshold, prediction module 26 may decrease the degree of likelihood that the user associated with computing device 10 would access application module 30A.

In some examples, after transitioning from operating in the second operational state to operating in the first operational state, and responsive to determining that the degree of likelihood does not satisfy the likelihood threshold, computing device 10 may refrain from outputting the graphical user interface associated with the first application, and instead, output, for display, a graphical user interface associated with the second application. For example, after updating the degree of likelihood associated with application module 30A (e.g., the previously accessed application module 30 prior to the transition from the full-operational state to the limited-operational state), UI module 20 may prevent UID from presenting GUI 16A (FIG. 1). Instead, UI module 20 may cause UID to present GUI 16N when UI module 20 determines that the likelihood associated with application module 30N (e.g., corresponding to the likelihood threshold) exceeds the probability associated with application module 30A. UI module 20 may cause UID 12 to present GUI 16N of application module 30N when UI module 20 determines that an application related to a most recently received notification has a greater chance of being accessed by a user of computing device 10 after transitioning back to a full-operational state.

In some examples, the degree of likelihood associated with application module 30A comprises a first degree of likelihood, and the likelihood threshold is based on a second degree of likelihood determined based on the context that the user associated with the computing device would access, after the computing device has transitioned from operating in the second operational state to operating in the first operational state and prior to the user accessing the first application, the second application. That is, UI module 20 may compare the degree of likelihood associated with application modules 30A and 30N and cause UID 12 to present the respective GUI (e.g., GUI 16A or 16N) that is associated with the one of application modules 30A and 30N that has the greater, respective degree of likelihood that the user would access that application.

In some examples, after transitioning from operating in the second operational state to operating in the first operational state, and responsive to determining that the degree of likelihood satisfies a likelihood threshold, computing device 10 may update, based on the context, the graphical user interface associated with the first application prior to outputting the graphical user interface associated with the first application for display. In other words, even though UI module 20 may cause UID 12 to cease outputting GUI 16A for display when computing device 10 has transitioned from a full-operational state to a limited-operational state, application module 30A may continue to provide UI module 20 with up-to-date information to be presented as graphical content within GUI 16A. UI module 20 may cause UID 12 to present the up-to-date (e.g., refreshed) GUI 16A when computing device 10 has transitioned back to the full-operational state.

Figure 3:
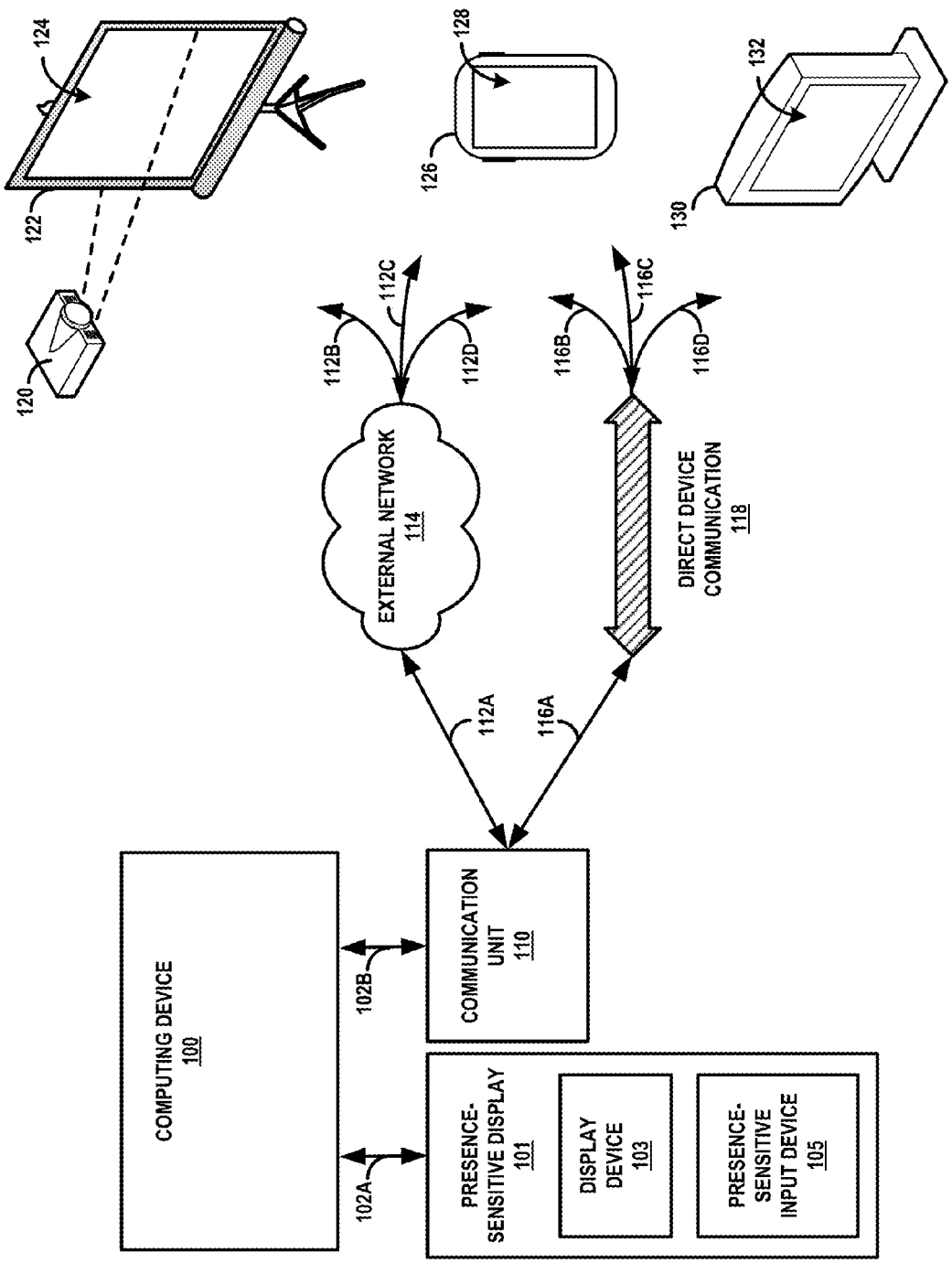
FIG. 3 is a conceptual block diagram illustrating an example computing device that outputs graphical content for display at a remote device, in accordance with one or more techniques of the present disclosure

FIG. 3 is a conceptual block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIG. 1 as multiple stand-alone computing device 10, a computing device such as computing devices 10 and 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 10 in FIG. 1, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, heads up display (HUD) and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, automobile displays, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may send graphical content via external network 114 to cause display device 130 to present a GUI of an Internet browser application as a user of computing device 100 interacts with the application.

After a period where computing device 100 detects a lack of input from the user, computing device 100 may transition from the first operational state to a second operational state. While operating in the second operational state, computing device 10 may refrain from outputting, e.g., the GUI of the Internet browser application. In addition, a text-messaging application executing at computing device 100 may receive a notification indicating that a new text-message was received by a text-messaging account associated with the user.

Computing device 100 may determine, based on contextual information received by computing device 100 (e.g., location data, orientation data) whether to present the GUI of the Internet browser application when computing device 100 has transitioned back to the first operational state, or whether to present the GUI of the text-message application recently received by computing device 100.

Computing device 100 may transition from the second operational state back to the first operational state and after determining that the probability that the user would want to access the text-messaging application prior to accessing the Internet browser application, cause display device 130 to present a GUI of the text-messaging application. Computing device 100 may output, for display, graphical content (e.g., instructions) via direct device communication 118 or external network 114 to display device 130 to cause display device 130 to present the GUI of the text-messaging application.

In some examples, computing device 100 may determine an amount of time since the notification was received. The degree of likelihood that the user associated with the computing device would access the first application and not the second application may be determined based at least in part on whether the amount of time satisfies a time threshold. In other words, computing device 100 may determine that if the text-message notification was received within a certain period of time (e.g., one second, one minute, one hour) since computing device 100 began to transition back to the second operational state, computing device 100 may assign a higher probability to the text-message application than the probability that computing device 100 assigns to the Internet browser application. Conversely, if the text-message notification was not received within the time threshold since computing device 100 began to transition back to the second operational state, computing device 100 may assign a lower probability to the text-message application than the probability that computing device 100 assigns to the Internet browser application.

In some examples, computing device 100 may determine an amount of time since the transition from the first operational state to the second operational state. The degree of likelihood that the user associated with the computing device would access the first application and not the second application may be determined based at least in part on whether the amount of time satisfies a time threshold. That is, computing device 100 may determine that computing device 10 was operating in the second operational state for only a certain period of time (e.g., one second, one minute, one hour), and computing device 100 may assign a higher probability to the Internet browser application (e.g., the previously interacted with application) than the probability that computing device 100 assigns to the text-message application (e.g., the application related to the most recently received notification). Conversely, if computing device 10 was operating in the second operational state for more than a certain period of time, computing device 100 may assign a lower probability to the Internet browser application than the probability that computing device 100 assigns to the text-message application.

Figure 4C:
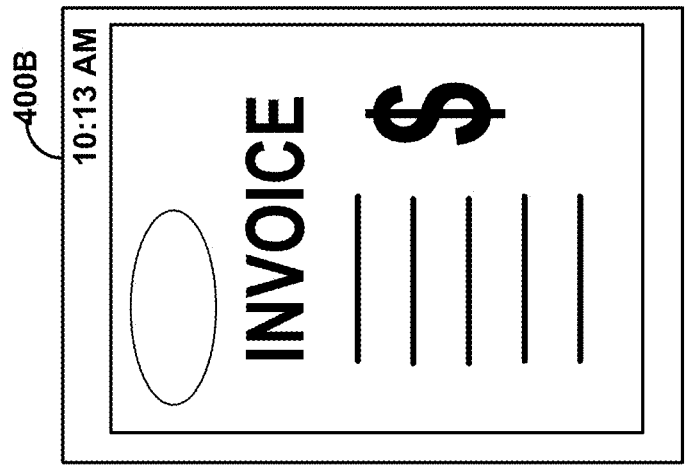
FIGS. 4A-4C are conceptual diagrams illustrating example graphical user interfaces that are output for display by an example computing device, in accordance with one or more aspects of the present disclosure.
Figure 4B:
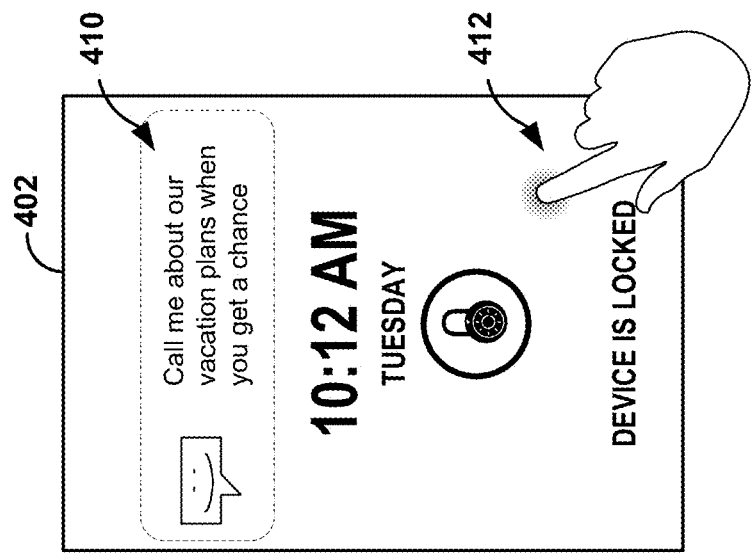
Figure 4A:
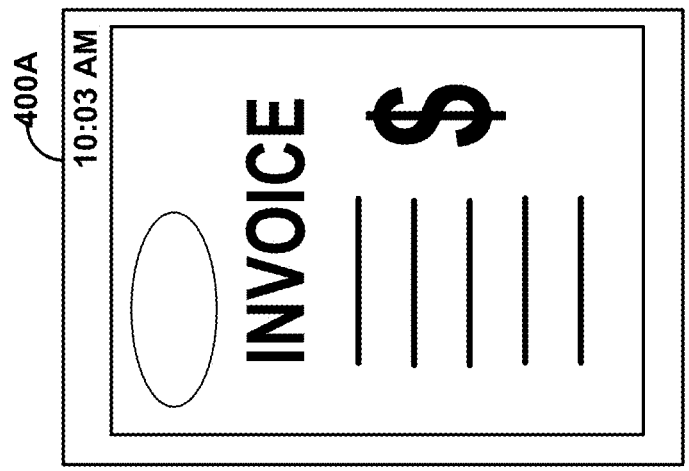

FIGS. 4A-4C are conceptual diagrams illustrating example graphical user interfaces being displayed by an example computing device, in accordance with one or more aspects of the present disclosure. FIGS. 4A-4C are described below within the context of computing device 10 of FIGS. 1 and 2 described above.

FIG. 4A illustrates GUI 400A which is associated with a finance application executing at computing device 10. While a user of computing device 10 is at a work location, the user may interact with a finance application (e.g., one of application modules 30) executing at computing device 10. UI module 20 may cause UID 12 to present GUI 400A while the user performs work related tasks with computing device 10 and computing device 10 operates in a full-operational state.

The user may take a break from interacting with computing device 10 and access module 24 may detect the break in activity from the user 10 and cause computing device 10 to transition from the full-operational state to a limited-operational state. In response to transitioning to the limited-operational state, UI module 20 may cause UID 12 to refrain from presenting graphical content, including GUI 400A. Context module 22 may determine a current location of computing device 10 just prior to the transition by computing device 10 to the limited-operational state and provide the current location as an input to prediction module 26 for use in determining a GUI to present when and if computing device 10 has transitioned back to the full-operational state.

FIG. 4B illustrates GUI 402 which is represents a lock-screen or other type of GUI that UI module 20 may present at UID 12 while computing device 10 executes in the limited-operational state. While operating in the limited-operational state, computing device 10 may receive a notification associated with a messaging application executing at computing device 10. For instance, FIG. 4B shows graphical indication 410 which represents a graphical element, banner, window, pop-up, overlay, etc. that may be presented by UI module 20 at UID 12 in response to receiving a notification while also presenting GUI 402. Graphical indication 410 includes textual information based on a message sent from a messaging account associated with another user and received by the messaging account associated with the user of computing device 10. The textual information includes the phrase, "Call me about this weekend when you get a chance."

FIG. 4B further illustrates that when the user wishes to resume interacting with computing device 10, the user of computing device 10 may provide input 412 (e.g., a gesture) at a location of UID 12 that presents GUI 402. Access module 24 may receive, from UI module 20, information about input 412 (e.g., location, speed, shape, direction) and, based on the information about input 412, cause computing device 10 to transition from the limited-operational state back to the full-operational state.

Context module 22 may determine an updated current location of computing device 10 to still be the work location and provide the current location of computing device 10 to UI module 20. UI module 20 may determine, based on textual information associated with the notification, a degree of correlation between the notification and the current location and determine the degree of likelihood that the user associated with computing device 10 would access the messaging application and/or the finance application (e.g., the application that he or she was interacting with prior to the transition to the limited-operational state) based at least in part on the degree of correlation between the notification and the current location. In other words, prediction module 26 may provide the at least a portion of the textual information of the notification received by computing device 10 (e.g., the text "Call me about our vacation plans when you get a chance"), a time element indication when the notification was received, and/or the location of computing device 10 as input to the machine learning algorithm of prediction module 26 to determine a probability that the user would prefer to access the messaging application over the finance application when computing device 10 has transitioned back to the full-operational state.

Prediction module 26 may infer that since the current location of computing device 10 continues to be the work location, that the information contained in the notification may not as relevant to the user at the current time (e.g., while he or she is at work) because the notification has the phrase "vacation" in the textual information, implying that the notification is about something other than the user's work. In other words, prediction module 26 may adjust a degree of likelihood that a user may wish to access a notification related application initially after computing device 10 has transitioned back to a full-operational operational state based on the information contained within a most recently received notification. In some examples, prediction module 26 may use other information, not just textual information, associated with a notification to determine a likelihood that the user may wish to access the notification. For example, prediction module 26 may determine the degree of likelihood based on a priority level of the notification, a type of the notification, or a name or contact identifier associated with the notification, etc. and based on the other information, adjust the degree of likelihood higher or lower relative to a degree of likelihood that the user may wish to access a GUI associated with a most recently used application.

Context module 22 may determine an updated current location of computing device 10 to still be the work location and provide the current location of computing device 10 to UI module 20. UI module 20 may determine, based on information associated with the finance application, a degree of correlation between the finance application and the current location, and determine the degree of likelihood that the user associated with computing device 10 would want to access either the messaging application or the finance application (e.g., the application that he or she was interacting with prior to the transition to the limited-operational state) based at least in part on the degree of correlation between the first application and the current location. In other words, prediction module 26 may provide information about the finance application (e.g., an indication of whether the application is a work related application, a game application, a social media application) along with the location of computing device 10 as input to the machine learning algorithm of prediction module 26 to determine a probability that the user would want to access the finance application when computing device 10 has transitioned back to the full-operational state.

Prediction module 26 may infer that, since the current location of computing device 10 continues to be the work location, the most recently access application (e.g., the finance application) may be most relevant to the user at the current time (e.g., while he or she is at work) because the finance application is likely related to the user's work. In other words, prediction module 26 may adjust a degree of likelihood that a user may wish to access a previously used application initially after computing device 10 has transitioned back to a full-operational operational state based on the information about that application.

FIG. 4C illustrates GUI 400B which is associated with the finance application executing at computing device 10. UI module 20 may determine that the degree of likelihood that the user associated with computing device 10 would access, after computing device 10 has transitioned from operating in the limited-operational state to operating in the full-operational state and prior to the user accessing the messaging application, the finance application and, automatically and without user intervention, cause UID 12 to output GUI 400B for display.

FIGS. 5A-5C are conceptual diagrams illustrating example graphical user interfaces being displayed by an example computing device, in accordance with one or more aspects of the present disclosure. FIGS. 5A-5C are described below within the context of computing device 10 of FIGS. 1 and 2 described above.

FIG. 5A illustrates GUI 500 which is associated with a finance application executing at computing device 10. While a user of computing device 10 is at a work location, the user may interact with the finance application (e.g., one of application modules 30) executing at computing device 10. UI module 20 may cause UID 12 to present GUI 500 while the user performs work related tasks with computing device 10 and computing device 10 operates in a full-operational state.

The user may take a break from interacting with computing device 10 and access module 24 may detect the break in activity from the user 10 and cause computing device 10 to transition from the full-operational state to a limited-operational state. In response to transitioning to the limited-operational state, UI module 20 may cause UID 12 to refrain from presenting graphical content, including GUI 500. Context module 22 may determine an initial context (e.g., an initial location of computing device 10, a current time) of computing device 10 just prior to the transition by computing device 10 to the limited-operational state and provide the initial context as an input to prediction module 26 for use in determining a GUI to present when and if computing device 10 has transitioned back to the full-operational state.

FIG. 5B illustrates GUI 502 which is represents a lock-screen or other type of GUI that UI module 20 may present at UID 12 while computing device 10 executes in the limited-operational state. While operating in the limited-operational state, computing device 10 may receive a notification associated with a messaging application executing at computing device 10. For instance, FIG. 5B shows graphical indication 510 which represents, e.g., a graphical element, banner, window, pop-up, overlay, that may be presented by UI module 20 at UID 12 in response to receiving a notification while also presenting GUI 502. Graphical indication 510 includes textual information based on a message sent from a messaging account associated with another user and received by the messaging account associated with the user of computing device 10. The textual information includes the phrase, "Have you left work yet."

FIG. 5B further illustrates that, when the user wishes to resume interacting with computing device 10, the user of computing device 10 may provide input 512 (e.g., a gesture) at a location of UID 12 that presents GUI 502. Access module 24 may receive, from UI module 20, information about input 512 (e.g., location, speed, shape, direction) and based on the information about input 512 cause computing device 10 to transition from the limited-operational state, back to the full-operational state.

Context module 22 may determine an updated (e.g., subsequent) context of computing device 10 (e.g., an updated location of computing device 10, an updated time of day). Prediction module 26 may receive the updated context from context module 22 and determine wither the updated context has changed as compared to the initial context that prediction module 26 received prior to the transition by computing device 10 from the full-operational state to the limited-operational state. In other words, prediction module 26 may determine a change in context from the initial context to the subsequent context. Prediction module 26 may provide the subsequent context to the machine learning algorithm used by prediction module 26 to determine the degree of likelihood that the user associated with computing device 10 would access the finance application (e.g., the application that the user was interacting with prior to the transition to the limited-operational state).

Responsive to determining that the change in context exceeds a change threshold, prediction module 26 may decrease the degree of likelihood that the user associated with computing device 10 would access the finance application, and responsive to determining that the change in context does not exceed a change threshold, prediction module 26 may increase the degree of likelihood that the user associated with computing device 10 would access the finance application. In other words, with a greater amount of change to the context of computing device 10 (e.g., a large amount of distance traveled by computing device 10, a large amount of time elapses) while computing device 10 operates in the limited-operational state, prediction module 26 may determine that the previously used finance application is less likely to be accessed by the user of computing device 10 when computing device 10 has transitioned back to operating in the full-operational state. Conversely, a lesser amount of change to the context of computing device 10 (e.g., a minimal amount of distance traveled by computing device 10, a minimal amount of time elapses) while computing device 10 operates in the limited-operational state, prediction module 26 may determine that the previously used finance application is more likely to be accessed by the user of computing device 10 when computing device 10 has transitioned back to operating in the full-operational state.

FIG. 5C illustrates that after transitioning from operating in the limited-operational state to operating in the full-operational state, and responsive to determining that the degree of likelihood associated with the finance application does not satisfy the likelihood threshold, UI module 20 may refrain from outputting GUI 500 (e.g., the GUI associated with the finance application) at UID 12 and instead, output GUI 504 (e.g., a graphical user interface associated with the messaging application) at UID 12.

Figure 6:
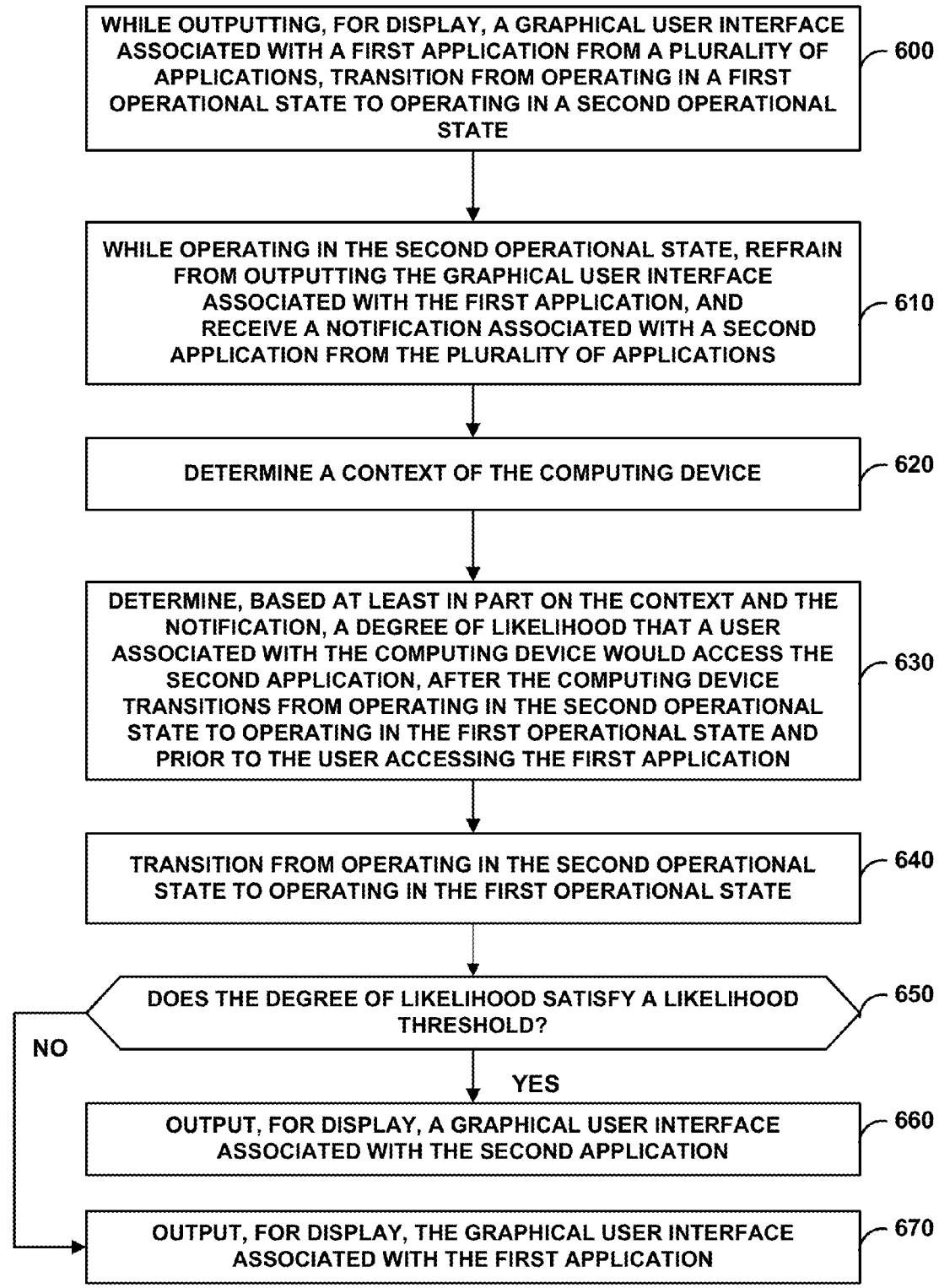
FIG. 6 is a flowchart illustrating example operations of an example computing device configured to output one or more graphical user interfaces, in accordance with one or more aspects of the present disclosure.

FIG. 6 is a flowchart illustrating example operations of an example computing device configured to output one or more graphical user interfaces, in accordance with one or more aspects of the present disclosure. The processes of FIG. 6 may be performed by at least one module operable by one or more processors of a computing device, such as computing device 10 illustrated in FIG. 1 and FIG. 2. For purposes of illustration, FIG. 6 is described below within the context of computing device 10 of FIGS. 1 and 2.

FIG. 6 illustrates that while outputting, for display, a graphical user interface associated with a first application from a plurality of applications, computing device 10 may transition from operating in a first operational state to operating in a second operational state (600). For example, UI module 20 may cause UID 12 to present GUI 16A which is associated with application module 30A. Access module 24 may cause computing device 10 to transition from operating in a full-operational state to operating in a limited-operational state.

As shown in FIG. 6, while operating in the second operational state, computing device 10 may refrain from outputting the graphical user interface associated with the first application and receive a notification associated with a second application from the plurality of applications (610). For example, UI module 20 may cause UID 12 to cease displaying GUI 16A. Application module 30N may receive a notification while computing device 10 operates in the limited-operational state. In some examples, the notification may be a highest priority notification received prior to determining whether the degree of likelihood that the user associated with the computing device would access the first application. In some examples, the notification may be a most recent notification received prior to determining whether the degree of likelihood that the user associated with the computing device would access the first application.

FIG. 6 shows that computing device 10 may determine a context of computing device 10 (620). For example, context module 22 may provide contextual information to UI module 20 from which UI module 20 may determine which one of application modules 30 that a user of computing device 10 may wish to access next.

As shown in FIG. 6, computing device 10 may determine, based at least in part on the context and the notification, a degree of likelihood that a user associated with the computing device would access the second application, after the computing device has transitioned from operating in the second operational state to operating in the first operational state and prior to the user accessing the first application (630). For example, prediction module 26 of UI module 20 may utilize a machine learning algorithm and/or one or more rules for determining whether the user is more likely to want to interact with application module 30A or 30N.

Computing device 10 may transition from operating in the second operational state to operating in the first operational state (640). For example, a user may provide input at UID 12 and cause access module 24 to transition computing device 10 from the limited-operational state back to the full-operational state.

FIG. 6 illustrates that computing device 10 may determine whether the degree of likelihood satisfies a likelihood threshold (650). UI module 20 may determine which one of application modules 30 (e.g., application module 30A or 3N) has a greater chance at being the application executing at computing device 10 that the user of computing device 10 may wish to access next.

If the degree of likelihood does satisfy the likelihood threshold, computing device 10 may output, for display, a graphical user interface associated with the second application (660). For example, if the degree of likelihood associated with application module 30N is greater than the threshold (e.g., zero percent) then UI module 20 may cause UID 12 to present GUI 16N (e.g., a GUI associated with a highest priority notification, a most recently received notification, or other notification obtained by computing device 10 while operating in the limited-operational state).

If the degree of likelihood does not satisfy the likelihood threshold, computing device 10 may output, for display, the graphical user interface associated with the first application (670). For example, if the degree of likelihood associated with application module 30N is less than a threshold (e.g., fifty percent, etc.) then UI module 20 may cause UID 12 to present GUI 16A.

In this manner, one or more of the techniques described herein may allow a computing device to ensure that when a user activates or powers-on a device (e.g., and configures the device to transition from one operational state to another) that the computing device quickly provides the user access to what he or she would want to access most with minimal interaction (e.g., input). Said differently, a computing device according to the techniques described herein may use various signals to disambiguate between a user's intent to resume a previous activity or instead to go to a different GUI (e.g., a notification related GUI, a device overview) while also providing an enhanced experience for the user.

In some examples, a computing device may have a "notifications framework." A computing device, whether in a pocket of a user or sitting on a table may attain a user's attention by outputting an alert indicative of an incoming notification (e.g., by outputting any combination of a vibration, a sound, a notification led). If a user wakes a device display within a short period after the device tries to attention a user's attention and outputting an alert, the computing device may interpret the waking of the display device as a clear signal or indication that the user's goal is to obtain more information related to that notification.

The computing device may define a time period of X amount of seconds after an interruptive notification is delivered, where if the device is awoken in that time period, the device may determine that the user wants more information on the notification. When the user wakes the display, the device may take the user into a state where the device is displays information about the notification (e.g., a notification list). In some examples, the device may affect the screen layout by auto-expanding a most recently received notification if a wakeup occurred within an a period of time less than the defined time period shorter period since the notification was delivered. A user may have the option to select a tuning associated with the device tune the specific time periods or deactivate the behavior entirely.

In some examples, other priority signals within a notification itself may be used by the computing device that can affect the likelihood of the user wanting to see a notification or bypass a notification and resume a previous activity. In some examples, a computing device may be configured to receive multiple, and different types of gestures for waking a display, to allow a user to explicitly provide more input about what he or she would like for the computing device to display upon wakeup. For instance, the computing device may detect the press of a power button and cause the computing device to present a GUI of one application and in response to detecting a tap gesture at a screen, present a GUI of a different application. In some examples, detecting a push of a power button may cause the computing device to navigate to one GUI, detecting a tap gesture may cause the computing device to navigate to a different GUI, and a detecting an input at a biometric sensor may cause the computing device to navigate to yet a different GUI. In some examples, the computing device may present different, respective GUIs based on different, types of gestures or other inputs. For instance one tap may wake a device to a lock screen GUI and a triple tap may cause the device to resume a previous activity and bypass security challenges. The device may be configurable by a user to allow the user to control and map various gestures and inputs to desired behavior. In this way, a computing device may be more battery efficient since the techniques do not require that a display be kept on. The techniques may allow a device to be predictive and to a user, may appear more attuned to what a user needs, and as such reduce the amount of time a user spends providing additional input to access a particular feature of the device.

Clause 1. A method comprising: while outputting, for display, a graphical user interface associated with a first application from a plurality of applications, transitioning, by a computing device, from operating in a first operational state to operating in a second operational state; while operating in the second operational state: refraining from outputting, by the computing device, the graphical user interface associated with the first application; and receiving, by the computing device, a notification associated with a second application from the plurality of applications; determining, by the computing device, a context of the computing device; determining, by the computing device and based at least in part on the context and the notification, a degree of likelihood that a user associated with the computing device would access, after the computing device has transitioned from operating in the second operational state to operating in the first operational state and prior to the user accessing the first application, the second application; and after transitioning from operating in the second operational state to operating in the first operational state, and responsive to determining that the degree of likelihood satisfies a likelihood threshold, outputting, by the computing device, for display, a graphical user interface associated with the second application.

Clause 2. The method of clause 1, further comprising: after transitioning from operating in the second operational state to operating in the first operational state, and responsive to determining that the degree of likelihood does not satisfy the likelihood threshold: refraining from outputting, by the computing device, the graphical user interface associated with the second application; and outputting, by the computing device, for display, the graphical user interface associated with the first application.

Clause 3. The method of any of clauses 1-2, further comprising: determining, by the computing device, an amount of time since the notification was received, wherein the degree of likelihood that the user associated with the computing device would access the second application is determined based at least in part on whether the amount of time satisfies a time threshold.

Clause 4. The method of any of clauses 1-3, wherein the determining, by the computing device, an amount of time since the transition from the first operational state to the second operational state, wherein the degree of likelihood that the user associated with the computing device would access the second application is determined based at least in part on whether the amount of time satisfies a time threshold.

Clause 5. The method of any of clauses 1-4, wherein the context is a subsequent context, the method further comprising: prior to transitioning from operating in the first operational state to operating in the second operational state, determining, by the computing device, an initial context of the computing device; and determining, by the computing device, a change in context from the initial context to the subsequent context, wherein the degree of likelihood that the user associated with the computing device would access the second application is further determined based at least in part on the change in the context.

Clause 6. The method of clause 5, further comprising: responsive to determining that the change in context exceeds a change threshold, decreasing, by the computing device, the degree of likelihood that the user associated with the computing device would access the second application; and responsive to determining that the change in context does not exceed the change threshold, increasing, by the computing device, the degree of likelihood that the user associated with the computing device would access the second application.

Clause 7. The method of any of clauses 1-6, the method further comprising: prior to transitioning from operating in the first operational state to operating in the second operational state, determining, by the computing device, an initial location of the computing device; and determining, by the computing device, based on the context, a subsequent location of the computing device; and modifying, by the computing device, based on a distance between the initial location and the subsequent location, the degree of likelihood that the user associated with the computing device would access the second application.

Clause 8. The method of clause 7, wherein modifying the degree of likelihood that the user associated with the computing device would access the second application comprises: responsive to determining that the distance does not exceed a threshold, increasing, by the computing device, the degree of likelihood that the user associated with the computing device would access the second application; and responsive to determining that the distance exceeds the threshold, decreasing, by the computing device, the degree of likelihood that the user associated with the computing device would access the second application.

Clause 9. A computing device comprising: at least one processor; and at least one module operable by the at least one processor to: while outputting, for display, a graphical user interface associated with a first application from a plurality of applications, transition from operating in a first operational state to operating in a second operational state; while operating in the second operational state: refrain from outputting the graphical user interface associated with the first application; and receive a notification associated with a second application from the plurality of applications; determine a context of the computing device; determine, based at least in part on the context and the notification, a degree of likelihood that a user associated with the computing device would access, after the computing device has transitioned from operating in the second operational state to operating in the first operational state and prior to the user accessing the first application, the second application; and after transitioning from operating in the second operational state to operating in the first operational state, and responsive to determining that the degree of likelihood satisfies a likelihood threshold, output, for display, a graphical user interface associated with the second application.

Clause 10. The computing device of clauses 9, wherein the at least one module is further operable by the at least one processor to: after transitioning from operating in the second operational state to operating in the first operational state, and responsive to determining that the degree of likelihood does not satisfy the likelihood threshold: refrain from outputting the graphical user interface associated with the second application; and output, for display, the graphical user interface associated with the first application.

Clause 11. The computing device of any of clauses 9-10, wherein the at least one module is further operable by the at least one processor to: determine, based on the context of the computing device, a current location of the computing device; and determine, based on textual information associated with the notification, a degree of correlation between the notification and the current location, wherein the degree of likelihood that the user associated with the computing device would access the second application is further determined based at least in part on the degree of correlation between the notification and the current location.

Clause 12. The computing device of any of clauses 9-11, wherein the at least one module is further operable by the at least one processor to: determine, based on the context of the computing device, a current location of the computing device; and determine, based on information associated with the first application, a degree of correlation between the first application and the current location, wherein the degree of likelihood that the user associated with the computing device would access the second application is further determined based at least in part on the degree of correlation between the first application and the current location.

Clause 13. The computing device of any of clauses 9-12, wherein the notification comprises a highest priority notification received prior to determining whether the degree of likelihood that the user associated with the computing device would access the second application.

Clause 14. The computing device of any of clauses 9-13, wherein the notification comprises a most recent notification received prior to determining whether the degree of likelihood that the user associated with the computing device would access the second application.

Clause 15. The computing device of any of clauses 9-14, wherein the degree of likelihood comprises a first degree of likelihood, and the likelihood threshold is based on a second degree of likelihood determined based on the context that the user associated with the computing device would access, after the computing device has transitioned from operating in the second operational state to operating in the first operational state and prior to the user accessing the second application, the first application.

Clause 16. A computer-readable storage medium comprising instructions that, when executed configure one or more processors of a computing device to: while outputting, for display, a graphical user interface associated with a first application from a plurality of applications, transition from operating in a first operational state to operating in a second operational state; while operating in the second operational state: refrain from outputting the graphical user interface associated with the first application; and receive a notification associated with a second application from the plurality of applications; determine a context of the computing device; determine, based at least in part on the context and the notification, a degree of likelihood that a user associated with the computing device would access, after the computing device has transitioned from operating in the second operational state to operating in the first operational state and prior to the user accessing the first application, the second application; and after transitioning from operating in the second operational state to operating in the first operational state, and responsive to determining that the degree of likelihood satisfies a likelihood threshold, output, for display, a graphical user interface associated with the second application.

Clause 17. The computer-readable storage medium of clause 16 comprising additional instructions that, when executed configure the one or more processors of the computing device to: after transitioning from operating in the second operational state to operating in the first operational state, and responsive to determining that the degree of likelihood does not satisfy the likelihood threshold: refrain from outputting, for display, the graphical user interface associated with the second application; and prior to outputting, for display, the graphical user interface associated with the first application, updating, based on the context, the graphical user interface associated with the first application.

Clause 18. The computer-readable storage medium of any of clauses 16-17, wherein the second application comprises a notification center graphical user interface for accessing information associated with the notification, and the information associated with the notification is output for display via the notification center graphical user interface.

Clause 19. The computer-readable storage medium of any of clauses 16-18, wherein the notification comprises a most recently received notification since the computing device transitioned from the first operational state to the second operational state.

Clause 20. The computer-readable storage medium of any of clauses 16-19, wherein the context comprises at least one of: a location associated with the computing device, a time of day, a degree of movement associated with the computing device, an orientation associated with the computing device, a barometric pressure associated with the computing device, or an ambient light level associated with the computing device.

Clause 21. A device comprising means for performing any of the methods of clauses 1-8.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   while operating in a full operational state during which a display device is configured to present graphical content, outputting, by a computing device, for display at the display device, a graphical user interface associated with a first application from a plurality of applications;
   after determining an initial context of the computing device, transitioning, by the computing device, from operating in the full operational state to operating in a limited operational state during which the display device is configured to refrain from presenting graphical content;
   while operating in the limited operational state:
      refraining from outputting, by the computing device, the graphical user interface associated with the first application;
      receiving, by the computing device, a notification associated with a second application from the plurality of applications; and
      determining, by the computing device, a change in context from the initial context to a subsequent context of the computing device;
   determining, by the computing device and based at least in part on the change in context and the notification, a degree of likelihood that a user associated with the computing device would access, after the computing device has transitioned from operating in the limited operational state back to operating in the full operational state and prior to the user accessing the first application, the second application; and
   after transitioning from operating in the limited operational state back to operating in the full operational state, and responsive to determining that the degree of likelihood satisfies a likelihood threshold, outputting, by the computing device, for display at the display device, a graphical user interface associated with the limited application.

2. The method of claim 1, further comprising:
   after transitioning from operating in the limited operational state back to operating in the full operational state, and responsive to determining that the degree of likelihood does not satisfy the likelihood threshold:
      refraining from outputting, by the computing device, the graphical user interface associated with the second application; and
      outputting, by the computing device, for display at the display device, the graphical user interface associated with the first application.

3. The method of claim 1, further comprising:
   determining, by the computing device, an amount of time since the notification was received, wherein the degree of likelihood that the user associated with the computing device would access the second application is determined based at least in part on whether the amount of time satisfies a time threshold.

4. The method of claim 1, further comprising:
determining, by the computing device, an amount of time since the transition from the full operational state to the limited operational state, wherein the degree of likelihood that the user associated with the computing device would access the second application is determined based at least in part on whether the amount of time satisfies a time threshold.

5. The method of claim 1, further comprising:
responsive to determining that the change in context exceeds a change threshold, decreasing, by the computing device, the degree of likelihood that the user associated with the computing device would access the second application; and
responsive to determining that the change in context does not exceed the change threshold, increasing, by the computing device, the degree of likelihood that the user associated with the computing device would access the second application.

6. The method of claim 1, the method further comprising:
prior to transitioning from operating in the full operational state to operating in the limited operational state, determining, by the computing device, an initial location of the computing device;
determining, by the computing device, based on the context, a subsequent location of the computing device; and
modifying, by the computing device, based on a distance between the initial location and the subsequent location, the degree of likelihood that the user associated with the computing device would access the second application.

7. The method of claim 6, wherein modifying the degree of likelihood that the user associated with the computing device would access the second application comprises:
responsive to determining that the distance does not exceed a threshold, increasing, by the computing device, the degree of likelihood that the user associated with the computing device would access the second application; and
responsive to determining that the distance exceeds the threshold, decreasing, by the computing device, the degree of likelihood that the user associated with the computing device would access the second application.

8. A computing device comprising:
at least one processor; and
at least one module operable by the at least one processor to:
while operating in a full operational state, output, for display at a display device, a graphical user interface associated with a first application from the plurality of applications, wherein the display device is configured to present graphical content while the computing device operates in the full operational state and to refrain from presenting the graphical content while the computing device operates in a limited operational state;
after determining an initial context of the computing device, transition from operating in the full operational state to operating in the limited operational state;
while operating in the limited operational state:
refrain from outputting the graphical user interface associated with the first application;
receive a notification associated with a second application from the plurality of applications; and
determine a change in context from the initial context to a subsequent context of the computing device;
determine, based at least in part on the change in context and the notification, a degree of likelihood that a user associated with the computing device would access, after the computing device has transitioned from operating in the limited operational state back to operating in the full operational state and prior to the user accessing the first application, the second application; and
after transitioning from operating in the limited operational state back to operating in the full operational state, and responsive to determining that the degree of likelihood satisfies a likelihood threshold, output, for display at the display device, a graphical user interface associated with the second application.

9. The computing device of claim 8, wherein the at least one module is further operable by the at least one processor to:
after transitioning from operating in the limited operational state back to operating in the full operational state, and responsive to determining that the degree of likelihood does not satisfy the likelihood threshold:
refrain from outputting the graphical user interface associated with the second application; and
output, for display at the display device, the graphical user interface associated with the first application.

10. The computing device of claim 8, wherein the at least one module is further operable by the at least one processor to:
determine, based on the context of the computing device, a current location of the computing device; and
determine, based on textual information associated with the notification, a degree of correlation between the notification and the current location, wherein the degree of likelihood that the user associated with the computing device would access the second application is further determined based at least in part on the degree of correlation between the notification and the current location.

11. The computing device of claim 8, wherein the at least one module is further operable by the at least one processor to:
determine, based on the context of the computing device, a current location of the computing device; and
determine, based on information associated with the first application, a degree of correlation between the first application and the current location, wherein the degree of likelihood that the user associated with the computing device would access the second application is further determined based at least in part on the degree of correlation between the first application and the current location.

12. The computing device of claim 8, wherein the notification comprises a highest priority notification received prior to determining whether the degree of likelihood that the user associated with the computing device would access the second application.

13. The computing device of claim 8, wherein the notification comprises a most recent notification received prior to determining whether the degree of likelihood that the user associated with the computing device would access the second application.

14. The computing device of claim 8, wherein the degree of likelihood comprises a first degree of likelihood, and the likelihood threshold is based on a second degree of likelihood determined based on the context that the user associated with the computing device would access, after the computing device has transitioned from operating in the limited operational state back to operating in the full operational state and prior to the user accessing the second application, the first application.

15. The computing device of claim 8, wherein the at least one module is further operable by the at least one processor to:
    disable the display device while operating in the limited operational state; and
    enable the display device while operating in the full operational state.

16. A computer-readable storage medium comprising instructions that, when executed configure one or more processors of a computing device to:
    while operating in a full operational state during which a display device is configured to present graphical content, output, for display at the display device, a graphical user interface associated with a first application from the plurality of applications;
    after determining an initial context of the computing device, transition from operating in the full operational state to operating in the limited operational state during which the display device is configured to refrain from presenting graphical content;
    while operating in the limited operational state:
        refrain from outputting the graphical user interface associated with the first application;
        receive a notification associated with a second application from the plurality of applications; and
        determine a change in context from the initial context to a subsequent context of the computing device;
    determine, based at least in part on the context and the notification, a degree of likelihood that a user associated with the computing device would access, after the computing device has transitioned from operating in the limited operational state to operating in the first operational state and prior to the user accessing the first application, the second application; and
    after transitioning from operating in the limited operational state back to operating in the full operational state, and responsive to determining that the degree of likelihood satisfies a likelihood threshold, output, for display at the display device, a graphical user interface associated with the second application.

17. The computer-readable storage medium of claim 16, further comprising additional instructions that, when executed configure the one or more processors of the computing device to:
    after transitioning from operating in the limited operational state back to operating in the full operational state, and responsive to determining that the degree of likelihood does not satisfy the likelihood threshold:
    refrain from outputting, for display, the graphical user interface associated with the second application; and
    prior to outputting, for display, the graphical user interface associated with the first application, updating, based on the context, the graphical user interface associated with the first application.

18. The computer-readable storage medium of claim 16, wherein the notification comprises a most recently received notification since the computing device transitioned from the full operational state to the limited operational state.

19. The computer-readable storage medium of claim 16, wherein the context comprises at least one of:
    a location associated with the computing device,
    a time of day,
    a degree of movement associated with the computing device,
    an orientation associated with the computing device,
    a barometric pressure associated with the computing device, or
    an ambient light level associated with the computing device.

* * * * *